United States Patent
Kornmann et al.

(10) Patent No.: US 8,706,804 B2
(45) Date of Patent: Apr. 22, 2014

(54) MODELED CHAINING OF SERVICE CALLS

(75) Inventors: Tim Kornmann, Wiesloch (DE); Dirk Stumpt, Graben-Neudorf (DE); Gerd Martin Ritter, Heidelberg (DE); Rene Gross, Heidelberg (DE)

(73) Assignee: SAP AG, Walldorf (DE)

( * ) Notice: Subject to any disclaimer, the term of this patent is extended or adjusted under 35 U.S.C. 154(b) by 342 days.

(21) Appl. No.: 13/324,040

(22) Filed: Dec. 13, 2011

(65) Prior Publication Data

US 2013/0151585 A1 Jun. 13, 2013

(51) Int. Cl.
*G06F 15/16* (2006.01)
*G06F 15/167* (2006.01)

(52) U.S. Cl.
USPC .................. 709/203; 709/212; 709/213

(58) Field of Classification Search
USPC ............. 709/201–203, 205, 226, 217–219
See application file for complete search history.

(56) References Cited

U.S. PATENT DOCUMENTS

| 5,341,475 | A  | * | 8/1994 | Austruy et al. | 709/213 |
| 8,243,745 | B2 | * | 8/2012 | Endo et al. | 370/412 |
| 2010/0220743 | A1 | * | 9/2010 | Endo et al. | 370/429 |
| 2011/0173635 | A1 | * | 7/2011 | berg | 719/312 |

\* cited by examiner

*Primary Examiner* — John B. Walsh
(74) *Attorney, Agent, or Firm* — Buckley, Maschoff & Talwalkar LLC

(57) ABSTRACT

A computer-implemented system may include reception of a user interface request corresponding to two or more chained operations associated with one or more service calls to a backend service layer, determination of whether to update a backend buffer after execution of each of the one or more service calls, execution, if it is determined to update the backend buffer after execution of each of the one or more service calls, of each of the one or more service calls, and a read service call after execution of each of the one or more service calls, and execution, if it is determined not to update the backend buffer after execution of each of the one or more service calls, of each of the one or more service calls in sequence, and a bulk read service call only after execution of all of the one or more service calls.

15 Claims, 8 Drawing Sheets

MODELED CHAINING OF SERVICE CALLS

FIELD

Some embodiments relate to user interfaces for accessing enterprise services. More specifically, some embodiments relate to systems to efficiently process backend service calls based on user interface requests.

BACKGROUND

According to a service-oriented architecture, a backend service layer provides services (i.e., business functionality) to service consumers, typically via Web protocols. FIG. 1 is a block diagram illustrating one such scenario. Typical service consumers use this business functionality to provide user interfaces, application-to-application or business-to-business integration, output management (e.g., printing), spreadsheet download, etc. Service consumers of different types, or even of a same type, may access the backend service layer in different ways. Therefore, the services are not particularly adapted to the requirements of any particular service consumer.

A backend service layer exposes complex services which may be used to orchestrate its underlying business logic. However, a developer of a user interface client application simply binds user interface data entities of a user interface data model to entities of the backend service layer, and then develops user interface logic (e.g., logic for computing user interface indicators or coloring/hiding fields) in terms of the user interface data model. That is, the developer is concerned only with user interaction and the exposure of data and events on the user interface, and is not concerned with orchestration of the underlying business logic.

Some operations of the user interface logic might require access to backend services. These UI requests typically require multiple service calls in the backend service layer, such as modification of data, execution of actions, saving, coping with pending modifications, value help request processing, reacting on data changes, retrieving data, retrieving properties, etc.

From a modeling perspective, a request sent by a user interface client application to the backend service layer corresponds to a backend operation contained inside an event handler. Execution of a backend operation will force a request from the user interface client application to a backend runtime, because the client data buffers and backend buffers are synchronized in order to show current data to the user.

An event handler can contain multiple backend operations, each of which may correspond to one or more service calls. Moreover, several complex change services may be executed in a chain and, after each operation, data will be read in the backend runtime and sent to the UI client runtime. This approach is undesirable because the net backend runtime consumption (i.e., time of roundtrip) must be considered as well as the amount of roundtrips in combination with the network latency. Therefore, in case the server is located in Germany and the user is located in China, a possibly high network latency of a client request will affect the overall performance negatively in case of many roundtrips.

Furthermore, the execution of the related backend services separately without regard to one another increases support and development complexity, since, for example, support engineers have to cope with separate code executions that logically belong together. Furthermore, the foregoing system involves redundant code execution for data retrieval, which the support engineers have to check as well.

DETAILED DESCRIPTION

Figure 1:
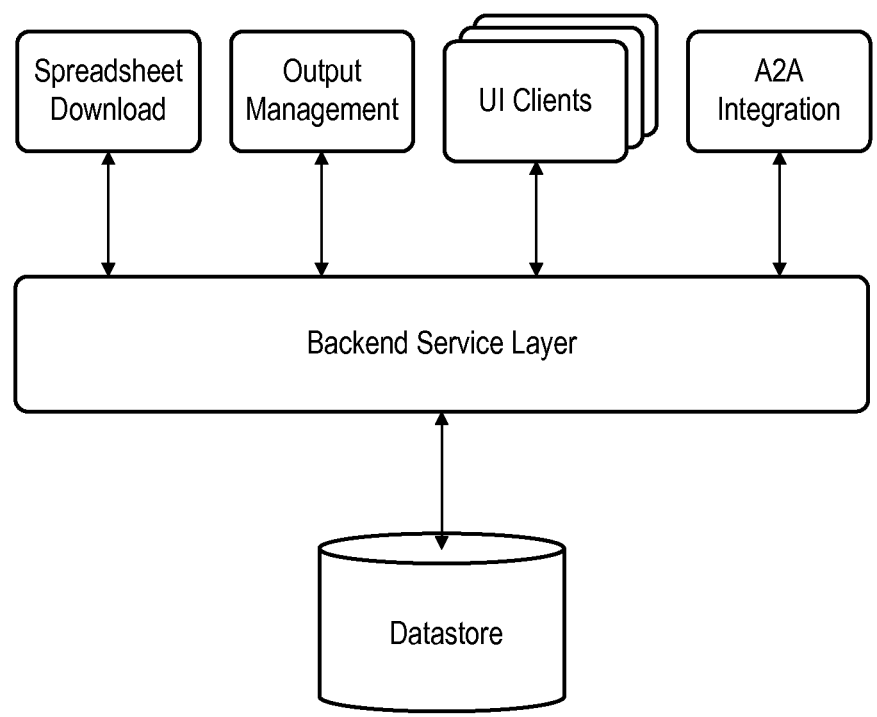
FIG. 1 is a block diagram of a system.
Figure 2:
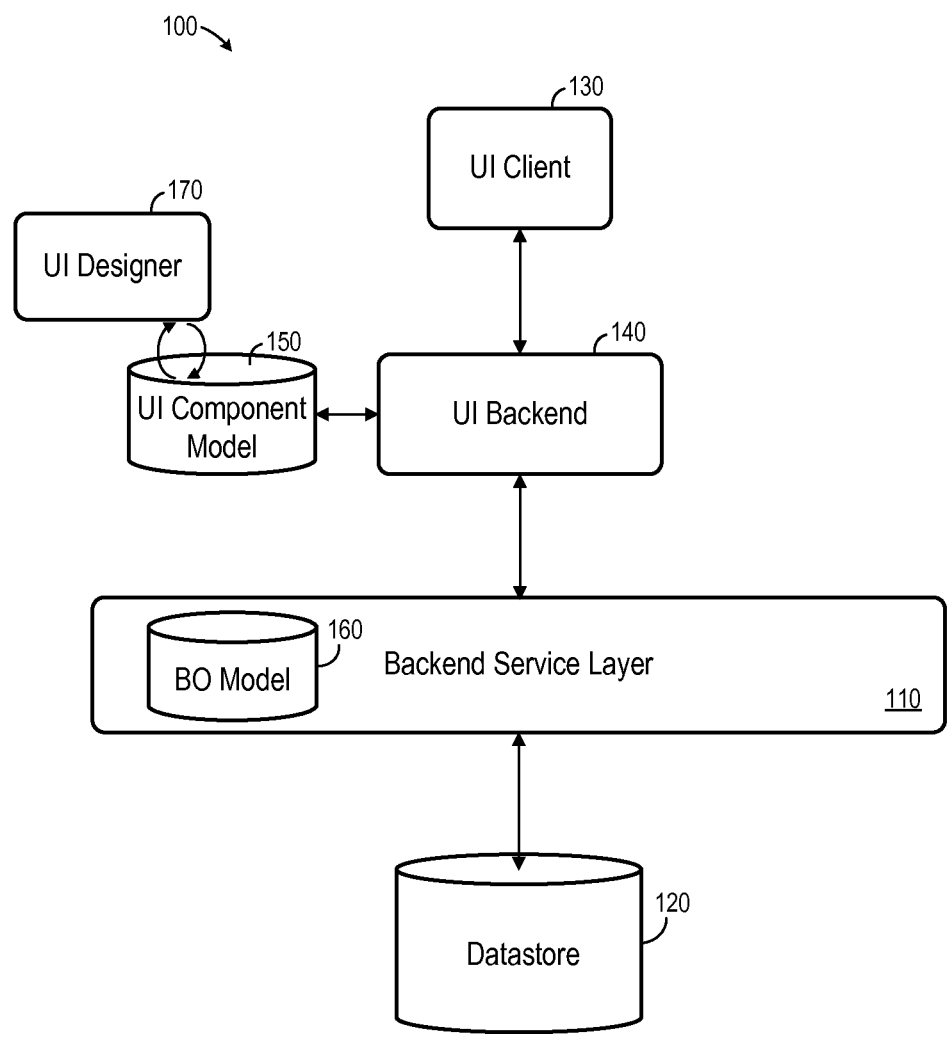
FIG. 2 is a block diagram of a system according to some embodiments.

FIG. 2 is a detailed block diagram of system 100 according to some embodiments. System 100 includes backend service layer 110, datastore 120, user interface (UI) client 130, UI backend 140, UI component model 150, business object model 160 and UI designer 170. FIG. 2 represents a logical architecture for describing some embodiments, and actual implementations may include more or different components arranged in any manner.

Backend service layer 110 may comprise an enterprise services infrastructure and/or any implementation for providing services according to a service-oriented architecture paradigm. The primary entities of backend service layer 110 are "business objects", which are software models defined by metadata of BO model 160 and representing real-world entities involved in business transactions. For example, a business object may represent a business document such as a sales order, a purchase order, or an invoice. A business object may also represent master data objects such as a product, a business partner, or a piece of equipment. Particular documents and master data objects (e.g., SalesOrder SO4711, ACME corporation) are represented by instances of their representing business object, or business object instances. Business objects expose their data in a complex, normalized data tree which consists of nodes containing attributes, actions (executing business logic on a node) and associations to other nodes.

As described above, backend service layer 110 may provide services to one or more service consumers. The services are provided by executing processes conforming to business object model 160. According to the illustrated embodiment, the services may include retrieving, creating, modifying and/or deleting the data of business object instances stored in datastore 120. Datastore 120 may comprise any one or more systems to store business data. Such systems include, but are not limited to, relational database systems, Online Analytical Processing (OLAP) database systems, data warehouses, application servers, and flat files.

UI designer 170 may be operated by a developer to design user interfaces based on UI component model 150. UI component model 150 may be suited to implementation of a user interface. For example, various UI elements, such as drop-down menus, trees, and fact sheets, are defined in the UI component model 150. The developer adds these UI elements to screen layout patterns and binds the elements to entities of BO model 160. This binding facilitates the transmission of data to and from backend service layer 110.

UI designer 170 may allow a developer to model a "bracket" within a UI component event handler, which includes two or more operations. Modeling such a bracket signifies that execution of the backend service calls corresponding to the two or more operations should be chained as will be described below. As also described below, such chaining may proceed in one of two (or more) selectable manners, based upon the value assigned by the developer to a flag associated with the bracket.

UI client 130 comprises an application to render user interfaces which were designed based on UI component model 150. That is, specific drop-down menus, trees, fact sheets, etc. rendered by UI client 130 according to a user interface are instances of their corresponding objects defined in UI component model 150. UI client 130 also receives user input (e.g., modification of data within a displayed field, selection of an item from a drop-down menu, selection of a checkbox, etc.) and, in response, transmits a corresponding UI request to UI backend 140. UI client 130 may execute, for example, within a Web browser.

According to some embodiments, UI client 130 is located at a client or user site, while the other elements of system 100 are housed at a provider site and may provide services to other UI clients located at the same or another user site. The other elements need not always be accessible to UI client 130. That is, UI client 130 may operate in an "offline" mode.

UI backend 140 provides communication between UI client 130 and backend service layer 110. Generally, UI backend 140 receives a UI request which conforms to UI component model 150 from UI client 130, communicates with backend service layer 110 to fulfill the request, and provides a response which conforms to UI component model 150 to UI client 130. Operation of UI backend 140 according to some embodiments will be described below.

Figure 3A:
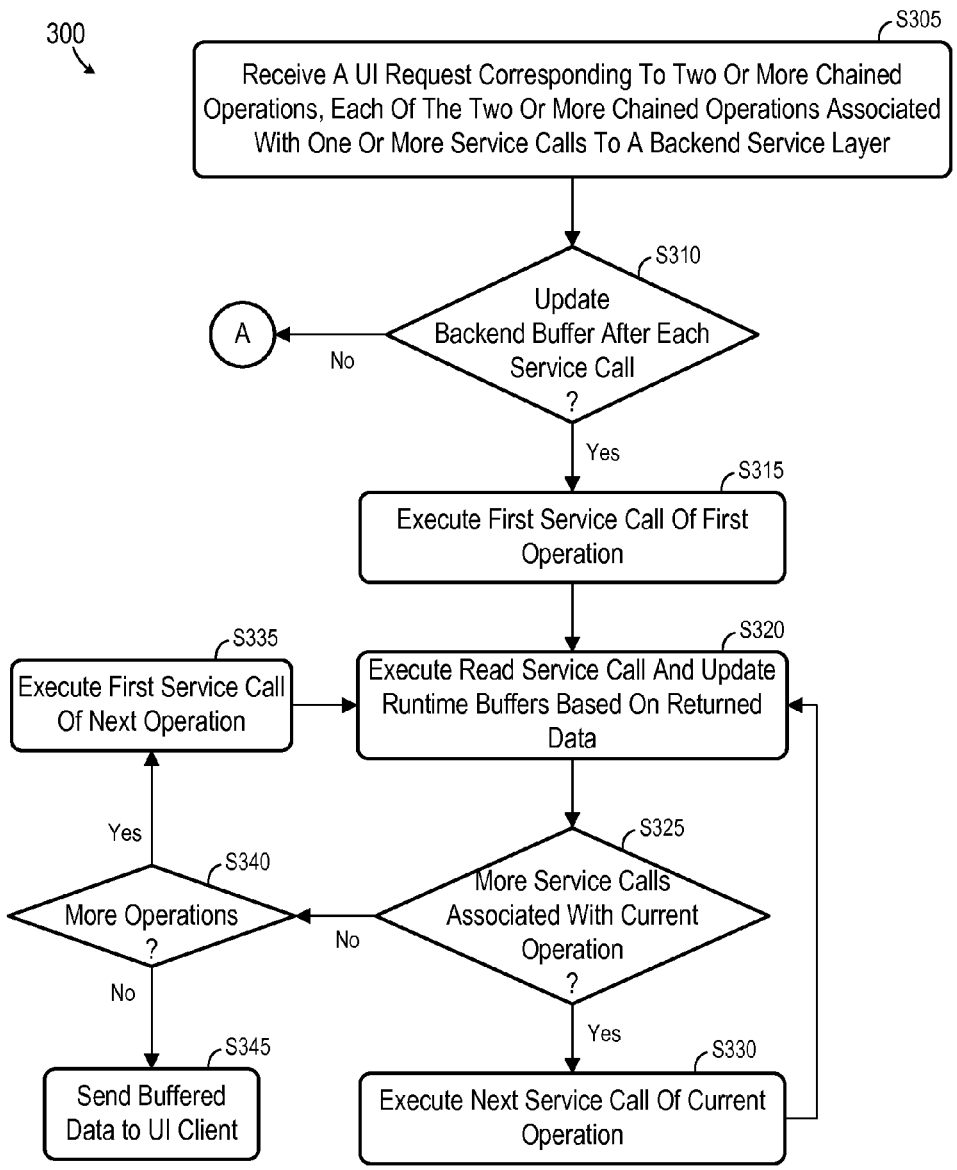
FIGS. 3A and 3B illustrate a flow diagram of process steps according to some embodiments.
Figure 3B:
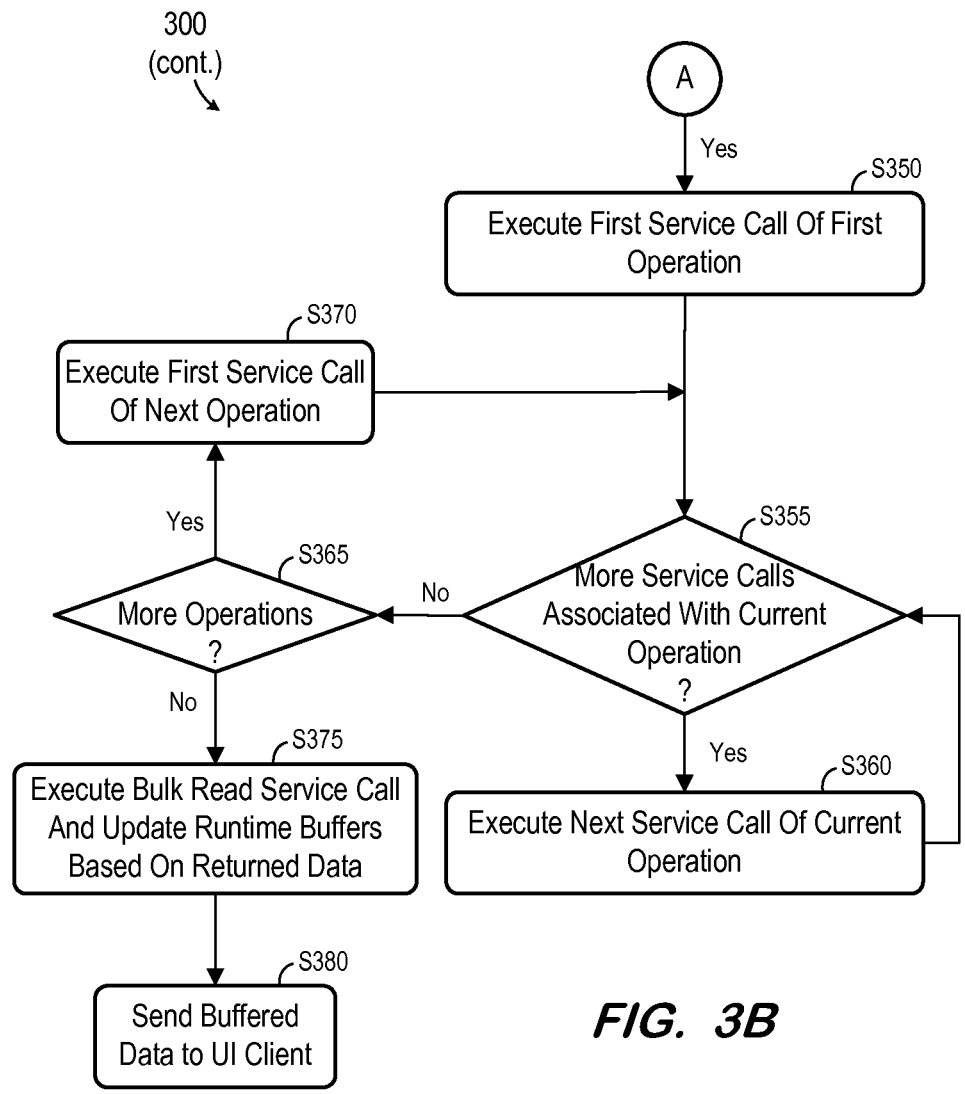

FIGS. 3A and 3B comprise a flow diagram of process 300 according to some embodiments. In some embodiments, one or more computing devices of an enterprise service provider execute program code to perform process 300. Examples of process 300 will be described below with respect to UI backend 140.

All processes mentioned herein may be embodied in processor-executable program code stored on one or more of non-transitory computer-readable media, such as a fixed disk, a floppy disk, a CD-ROM, a DVD-ROM, a Flash drive, and a magnetic tape. In some embodiments, hard-wired circuitry may be used in place of, or in combination with, program code for implementation of processes according to some embodiments. Embodiments are therefore not limited to any specific combination of hardware and software.

Initially, at S310, a UI request is received from a user interface client application. Referring to the FIG. 2 example, such a request may be received by UI backend 140 from UI client 130. The user interface request may include one or more user interface events that were triggered (e.g., selection of a drop-down menu), and/or one or more user interface data changes (e.g., changing a value in a displayed field). The user interface events are either events of the user interface component model or system events of the user interface framework. Each of the one or more user interface events may include a respective event parameter, which may provides additional details on how to process the request.

Moreover, a developer of the user interface has modeled the user interface request to correspond to two or more chained operations, where each of the two or more chained operations is associated with one or more service calls to a backend service layer. That is, the developer has modeled a bracket including the two or more operations as described above.

In one example of such a scenario, a particular status chain may be defined for a particular Business Object (e.g., 'requested'->'under approval'->'approved'->'ordered'->'delivered'->'paid'->'archived'). Accordingly, an instance of the Business Object cannot move directly from 'requested' status to 'approved' status; it must be assigned 'under approval' status before being assigned 'approved' status. A developer may define a 'Move to next status' action and allow a user to trigger this action in the user interface. Once triggered, and under conventional operation, a corresponding UI request is sent to UI backend 140, where some business logic is executed. As a result, the data currently shown in the user interface is changed in the buffers of UI backend 140 and these changes are sent to UI client 130. The displayed user interface and the data shown therein are changed accordingly and, due to these changes, some client-side scripts may be triggered.

However, the UI developer may wish to allow a user to change the status of an instance of the Business Object directly from 'requested' to 'ordered' (e.g., because the order total is below a certain limit). Conventionally, the developer would configure a chain of client-events where each of the events triggers a corresponding individual action and response in UI backend 140, in order to move the instance through the statuses "under approval', 'approved' and 'ordered' in response to a single action from the user. Such an approach may lead to unnecessary user interface re-calculations or field modifications (e.g., status drop-down is changed), resulting in a flickering user interface and the unnecessary transmission of data modifications from UI client 130 to UI backend 140.

By virtue of some embodiments, the UI developer may alternatively define a bracket around three Action Events (i.e., operations). The UI developer may set a KeepBufferInSync flag for the bracket to indicate that the three Action events should execute (i.e., under approval->approved->ordered) so as to suppress the transmission of undesired intermediate responses to UI client 130.

Returning to process 300 the UI request received at S305 is evaluated by UI backend 140 at S310 to determine whether to update a buffer of UI backend 140 after each service call of each chained operation within the request. Initially, it will be assumed that the KeepBufferInSync flag is set and that the determination at S310 is therefore affirmative.

Figure 4:
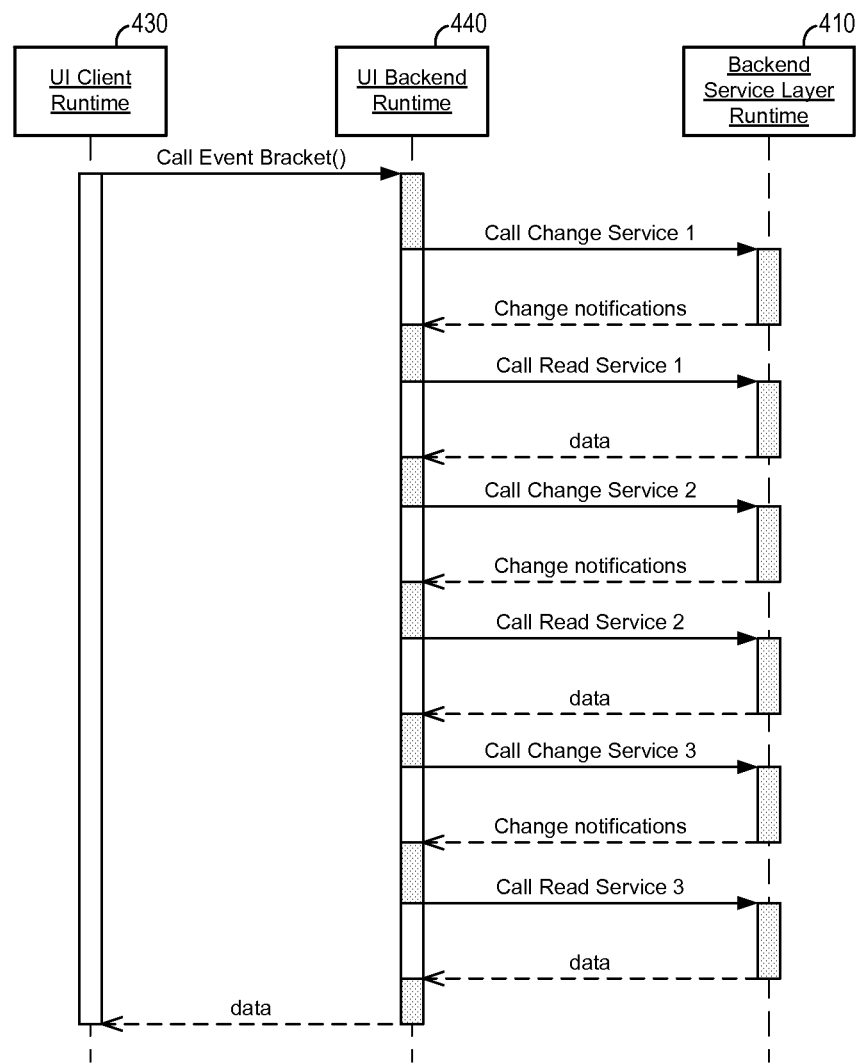
FIG. 4 is a sequence diagram according to some embodiments.

FIG. 4 is a sequence diagram illustrating update of the backend buffers after each service call according to some embodiments. As shown, UI client runtime 430 calls an event bracket, which is received by UI backend runtime 440 at S305. After the affirmative determination at S310, UI backend 440 calls backend service layer runtime 410 at S315 to execute a first service call of the first chained operation of the bracket. As also shown, execution of the first service call results in transmission of a change notification from backend service layer runtime 410 to UI backend 440.

Next, at S320, a read service call is executed (e.g., Call Read Service 1) and buffers of UI backend runtime 440 are updated based on the returned data. The read service call may be executed based on an evaluation of the previously-received change notification. At S325, it is determined whether more service calls are associated with the current (i.e., first) operation. Assuming this is true, a next service call associated with the operation is executed (e.g., Call Change Service 2) at S330. Flow returns to S320 to execute a read service call (e.g., Call Read Service 2) and to update the buffers of UI backend runtime 440 based on the returned data.

It will now be assumed that no further service calls are associated with the current operation of the present example. Flow therefore proceeds to S340 to determine if the bracket includes additional chained operations. If so, a first service call of a next operation is executed at S335 (e.g., Call Change Service 3) and the buffers are again updated with the returned data at S320. According to the FIG. 4 example, no more service calls are associated with the current operation, and no more operations are associated with the bracket. Therefore, flow proceeds through S325 and S340, and on to S345.

The data of the runtime buffers of UI backend runtime 440 is sent to UI client runtime 430 at S345. By virtue of the operation shown in FIG. 4, intermediate data values are not transmitted from UI backend runtime 440 to UI client runtime 430, thereby avoiding some of the drawbacks described above.

Returning to S310, it will be assumed that the KeepBufferInSync flag of the UI request received at S305 is not set. Accordingly, flow proceeds from S310 to S350 of FIG. 3B.

Figure 5:
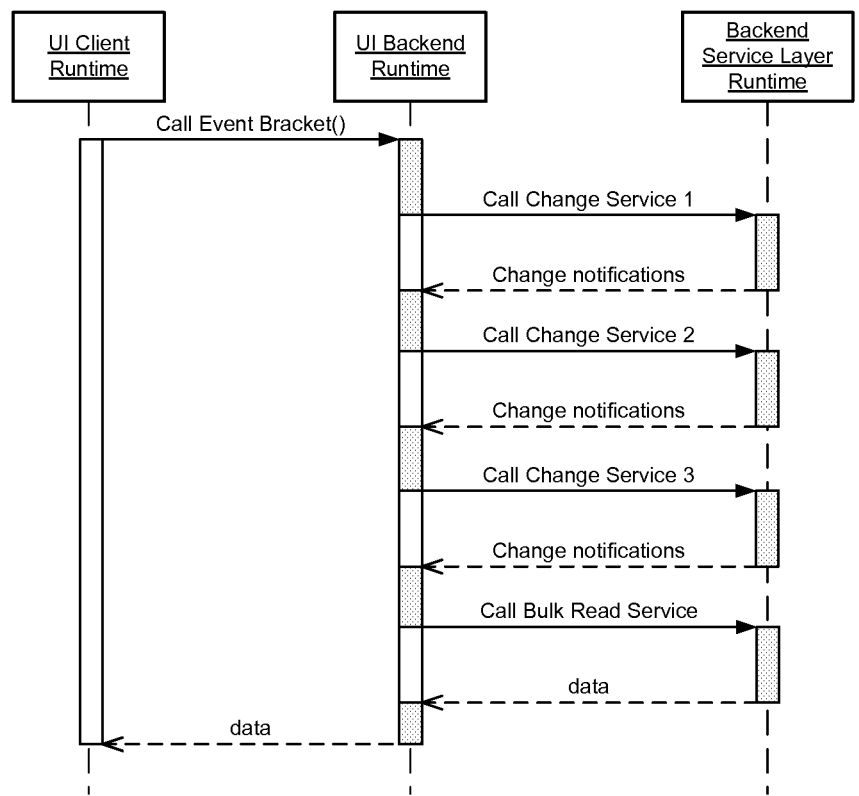
FIG. 5 is a sequence diagram according to some embodiments.

FIG. 5 is a sequence diagram according to some embodiments in which the backend buffers are not updated after each service call. Again, UI client runtime 430 calls an event bracket, which is received by UI backend runtime 440 at S305. After a negative determination at S310, UI backend 440 calls backend service layer runtime 410 at S350 to execute a first service call (e.g., Call Change Service 1) of the first chained operation of the bracket. Execution of this first service call results in transmission of a change notification from backend service layer runtime 410 to UI backend 440. However, unlike the sequence diagram of FIG. 4, no corresponding read service call is executed.

Rather, it is simply determined at S355 whether more service calls are associated with the current (i.e., first) operation. Assuming this is true, a next service call associated with the operation is executed (e.g., Call Change Service 2) at S360. Flow cycles between S355 and S360 to execute all the service calls of the current operation.

The present example assumes that the current operation is associated with two service calls. Flow therefore proceeds to S365 to determine if the bracket includes additional chained operations. If so, a first service call of a next operation is executed at S370 (e.g., Call Change Service 3) and flow returns to S355 without executing a corresponding read service call. According to the FIG. 5 example, no more service calls are associated with the current operation, and no more operations are associated with the bracket. Therefore, flow proceeds through S365 and to S375.

At S375, the previously-received change notifications are condensed and evaluated. Based on this evaluation, a bulk read service call is executed (e.g., Call Bulk Read Service) and buffers of UI backend runtime 440 are updated based on the returned data. Next, the data of the runtime buffers of UI backend runtime 440 is sent to UI client runtime 430 at S380. Like the operation of FIG. 4, the operation shown in FIG. 5, avoids transmission of intermediate data values from UI backend runtime 440 to UI client runtime 430. Moreover, the operation of FIG. 5 reduces the number of processing roundtrips between UI backend runtime 440 and backend service layer runtime 410.

Figure 6:
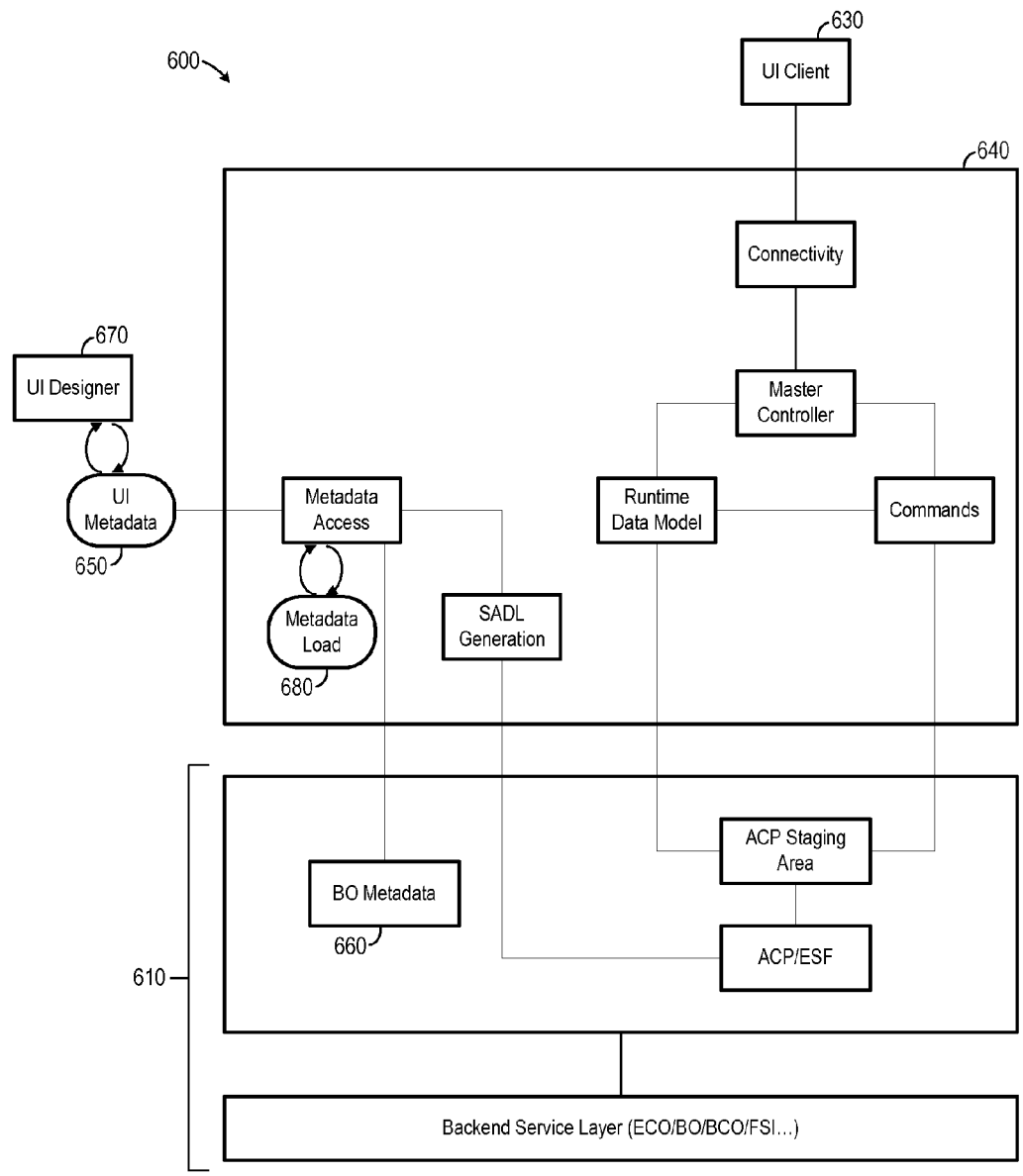
FIG. 6 is a detailed block diagram of a system according to some embodiments.

FIG. 6 is a block diagram of an implementation of system 100 according to some embodiments. Each numbered element of system 600 represents an implementation of a correspondingly-numbered element of system 600.

System 600 illustrates both design time and runtime aspects of the embodiments described herein. For example, UI designer 670 may build UI metadata 650 which conforms to a UI component model design, and which is used and evaluated by UI client 630. UI metadata 650 may specify the above-mentioned event brackets, chained operations, corresponding service calls and associated flags. Additionally, metadata load 680 is generated at runtime based on UI metadata 650 and business object metadata 660.

Figure 7:
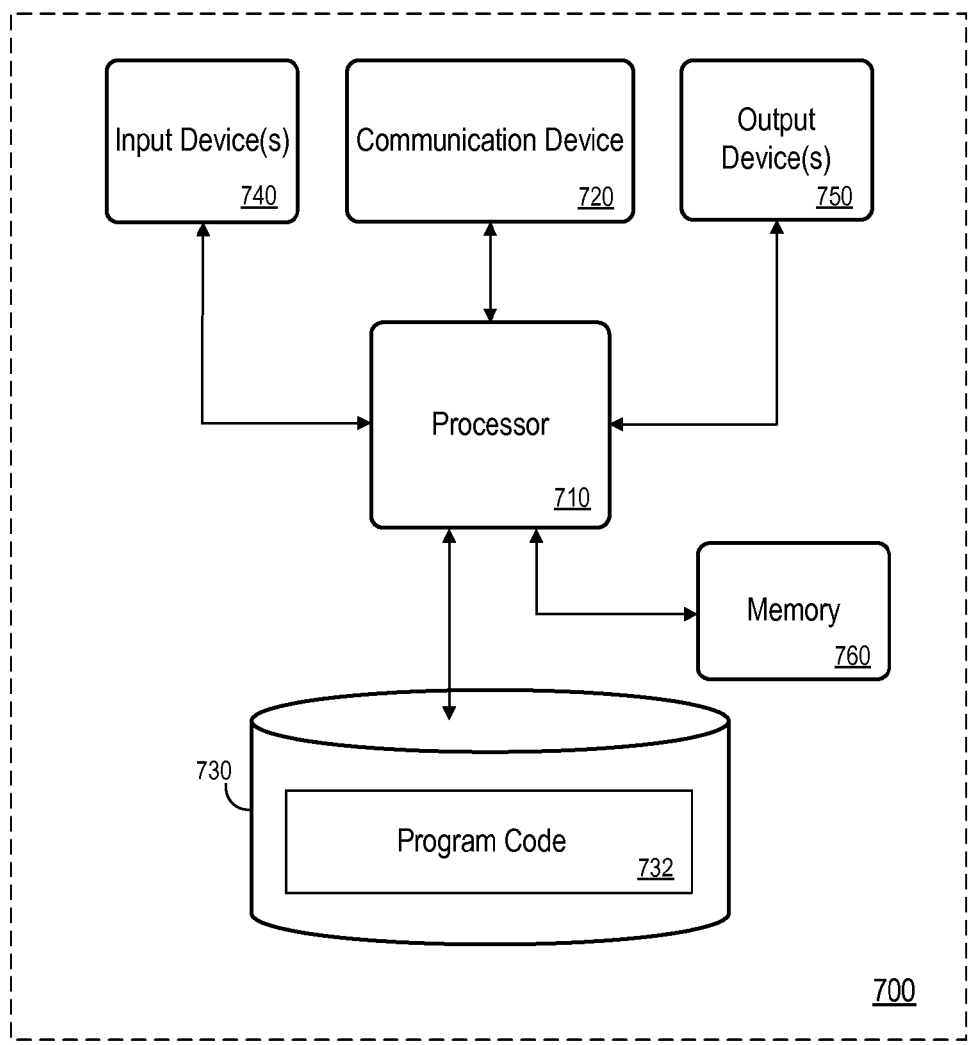
FIG. 7 is a block diagram of a computing device according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of UI backend 140. Apparatus 700 may include other unshown elements according to some embodiments.

Apparatus 700 includes processor 710 operatively coupled to communication device 720, data storage device 730, one or more input devices 740, one or more output devices 750 and memory 760. Communication device 720 may facilitate communication with external devices, such as a reporting client, or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Program code 732 may be executed by processor 710 to cause apparatus 700 to perform any one or more of the processes described herein. Embodiments are not limited to execution of these processes by a single apparatus. Data storage device 730 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system, the method comprising:
   receiving, from a user interface client application, a user interface request corresponding to two or more chained operations, each of the two or more chained operations associated with one or more service calls to a backend service layer;
   determining whether to update a backend buffer after execution of each of the one or more service calls associated with each of the two or more chained operations;
   if it is determined to update the backend buffer after execution of each of the one or more service calls associated with each of the two or more chained operations, executing each of the one or more service calls associated with each of the two or more chained operations, and executing a read service call after executing each of the one or more service calls; and
   if it is determined not to update the backend buffer after execution of each of the one or more service calls associated with each of the two or more chained operations, executing each of the one or more service calls associated with each of the two or more chained operations in sequence, and executing a bulk read service call only after executing all of the one or more service calls.

2. A computer-implemented method according to claim 1, wherein determining whether to update a backend buffer comprises:
   determining a value of a flag associated with the two or more chained operations.

3. A computer-implemented method according to claim 2, further comprising:
   receiving a change notification corresponding to each executed service call,
   if it is determined to update the backend buffer after execution of each of the one or more service calls associated with each of the two or more chained operations, evaluating each received change notification prior to executing a corresponding read service call; and
   if it is determined not to update the backend buffer after execution of each of the one or more service calls associated with each of the two or more chained operations, condensing the received change notifications prior to executing the bulk read service call.

4. A computer-implemented method according to claim 1, further comprising:
   receiving a change notification corresponding to each executed service call,
   if it is determined to update the backend buffer after execution of each of the one or more service calls associated with each of the two or more chained operations, evaluating each received change notification prior to executing a corresponding read service call; and
   if it is determined not to update the backend buffer after execution of each of the one or more service calls associated with each of the two or more chained operations, condensing the received change notifications prior to executing the bulk read service call.

5. A computer-implemented method according to claim 1, wherein executing a read service call after executing each of the one or more service calls comprises receiving data corresponding to each executed read service call and storing the received data in a backend runtime buffer, and
   wherein executing each of the one or more service calls associated with each of the two or more chained operations in sequence, and executing a bulk read service call only after executing all of the one or more service calls comprises receiving data corresponding to the executed bulk read service call and storing the received data corresponding to the executed bulk read service call in the backend runtime buffer.

6. A non-transitory computer-readable medium storing program code executable by a computing system to:
   receive, from a user interface client application, a user interface request corresponding to two or more chained operations, each of the two or more chained operations associated with one or more service calls to a backend service layer;
   determine whether to update a backend buffer after execution of each of the one or more service calls associated with each of the two or more chained operations;
   execute, if it is determined to update the backend buffer after execution of each of the one or more service calls associated with each of the two or more chained operations, each of the one or more service calls associated with each of the two or more chained operations, and a read service call after execution of each of the one or more service calls; and
   execute, if it is determined not to update the backend buffer after execution of each of the one or more service calls associated with each of the two or more chained operations, each of the one or more service calls associated with each of the two or more chained operations in sequence, and a bulk read service call only after execution of all of the one or more service calls.

7. A medium according to claim 6, wherein determination of whether to update a backend buffer comprises:
   determination of a value of a flag associated with the two or more chained operations.

8. A medium according to claim 7, the program code further executable by a computing system to:
   receive a change notification corresponding to each executed service call,
   evaluate, if it is determined to update the backend buffer after execution of each of the one or more service calls associated with each of the two or more chained operations, each received change notification prior to execution of a corresponding read service call; and
   condense, if it is determined not to update the backend buffer after execution of each of the one or more service calls associated with each of the two or more chained operations, the received change notifications prior to executing the bulk read service call.

9. A medium according to claim 6, the program code further executable by a computing system to:
   receive a change notification corresponding to each executed service call,
   evaluate, if it is determined to update the backend buffer after execution of each of the one or more service calls associated with each of the two or more chained operations, each received change notification prior to executing a corresponding read service call; and
   condense, if it is determined not to update the backend buffer after execution of each of the one or more service calls associated with each of the two or more chained operations, the received change notifications prior to executing the bulk read service call.

10. A medium according to claim 6, wherein execution of a read service call after execution of each of the one or more service calls comprises reception of data corresponding to each executed read service call and storage of the received data in a backend runtime buffer, and wherein execution of each of the one or more service calls associated with each of the two or more chained operations in sequence, and execution of a bulk read service call only after execution of all of the one or more service calls comprises reception of data corresponding to the executed bulk read service call and storage of the received data corresponding to the executed bulk read service call in the backend runtime buffer.

11. A computing system comprising:

a memory storing processor-executable program code; and a processor to execute the processor-executable program code to cause the system to:

receive, from a user interface client application, a user interface request corresponding to two or more chained operations, each of the two or more chained operations associated with one or more service calls to a backend service layer;

determine whether to update a backend buffer after execution of each of the one or more service calls associated with each of the two or more chained operations;

execute, if it is determined to update the backend buffer after execution of each of the one or more service calls associated with each of the two or more chained operations, each of the one or more service calls associated with each of the two or more chained operations, and a read service call after execution of each of the one or more service calls; and execute, if it is determined not to update the backend buffer after execution of each of the one or more service calls associated with each of the two or more chained operations, each of the one or more service calls associated with each of the two or more chained operations in sequence, and a bulk read service call only after execution of all of the one or more service calls.

12. A system according to claim 11, wherein determination of whether to update a backend buffer comprises:

determination of a value of a flag associated with the two or more chained operations.

13. A system according to claim 12, the processor to further execute the processor-executable program code to cause the system to:

receive a change notification corresponding to each executed service call, evaluate, if it is determined to update the backend buffer after execution of each of the one or more service calls associated with each of the two or more chained operations, each received change notification prior to execution of a corresponding read service call; and condense, if it is determined not to update the backend buffer after execution of each of the one or more service calls associated with each of the two or more chained operations, the received change notifications prior to executing the bulk read service call.

14. A system according to claim 11, the processor to further execute the processor-executable program code to cause the system to:

receive a change notification corresponding to each executed service call, evaluate, if it is determined to update the backend buffer after execution of each of the one or more service calls associated with each of the two or more chained operations, each received change notification prior to executing a corresponding read service call; and condense, if it is determined not to update the backend buffer after execution of each of the one or more service calls associated with each of the two or more chained operations, the received change notifications prior to executing the bulk read service call.

15. A system according to claim 11, wherein execution of a read service call after execution of each of the one or more service calls comprises reception of data corresponding to each executed read service call and storage of the received data in a backend runtime buffer, and wherein execution of each of the one or more service calls associated with each of the two or more chained operations in sequence, and execution of a bulk read service call only after execution of all of the one or more service calls comprises reception of data corresponding to the executed bulk read service call and storage of the received data corresponding to the executed bulk read service call in the backend runtime buffer.

* * * * *